(12) United States Patent
Soci

(10) Patent No.: US 12,492,031 B2
(45) Date of Patent: Dec. 9, 2025

(54) SEALING DEVICE FOR A PACKAGING MACHINE, PACKAGING MACHINE HAVING A SEALING DEVICE AND METHOD OF OPERATING A SEALING DEVICE

(71) Applicant: TETRA LAVAL HOLDINGS & FINANCE S.A., Pully (CH)

(72) Inventor: Fabio Soci, Modena (IT)

(73) Assignee: TETRA LAVAL HOLDINGS & FINANCE S.A., Pully (CH)

( * ) Notice: Subject to any disclaimer, the term of this patent is extended or adjusted under 35 U.S.C. 154(b) by 112 days.

(21) Appl. No.: 18/553,665

(22) PCT Filed: Apr. 5, 2022

(86) PCT No.: PCT/EP2022/058964
§ 371 (c)(1),
(2) Date: Oct. 2, 2023

(87) PCT Pub. No.: WO2022/214465
PCT Pub. Date: Oct. 13, 2022

(65) Prior Publication Data
US 2024/0199260 A1    Jun. 20, 2024

(30) Foreign Application Priority Data

Apr. 7, 2021 (EP) .................................. 21167121

(51) Int. Cl.
*B65B 51/22* (2006.01)
*B65B 51/30* (2006.01)
*B65B 51/10* (2006.01)

(52) U.S. Cl.
CPC ............ *B65B 51/225* (2013.01); *B65B 51/30* (2013.01); *B65B 2051/105* (2013.01)

(58) Field of Classification Search
CPC . B29C 65/08; B29C 65/7451; B29C 65/7894; B29C 66/91231; B65B 51/225; B06B 1/0607; B06B 3/02
(Continued)

(56) References Cited

U.S. PATENT DOCUMENTS

2014/0138012 A1    5/2014   Spicer et al.
2024/0425216 A1*  12/2024   Soci .................. B29C 66/95

FOREIGN PATENT DOCUMENTS

EP    3260383 A1    12/2017
JP    H04-319339 A  11/1992
(Continued)

OTHER PUBLICATIONS

International Search Report (PCT/ISA/210) and Written Opinion (PCT/ISA/237) mailed on Aug. 25, 2022, by the European Patent Office as the International Searching Authority for International Application No. PCT/EP2022/058964. (9 pages).
(Continued)

*Primary Examiner* — James D Sells
(74) *Attorney, Agent, or Firm* — BUCHANAN INGERSOLL & ROONEY PC

(57) ABSTRACT

There is described a sealing device for sealing packages filled with a pourable product within a packaging machine. The sealing device has at least one sonotrode comprising at least a sonotrode head and a vibration control unit connected to the sonotrode head and configured to actuate ultrasonic vibrations of the sonotrode head. The vibration control unit comprises one or more piezoelectric transducer devices configured to generate ultrasonic vibrations to be coupled into the sonotrode head and one or more temperature sensors configured to measure the temperature of the one or more piezoelectric transducer devices for determining and/or
(Continued)

monitoring respective operating states of the one or more piezoelectric transducer devices.

20 Claims, 5 Drawing Sheets

(58) Field of Classification Search
USPC .......................................................... 156/64
See application file for complete search history.

(56) References Cited

FOREIGN PATENT DOCUMENTS

| | | |
|---|---|---|
| JP | H07-265315 A | 10/1995 |
| JP | 2016-153317 A | 8/2016 |

OTHER PUBLICATIONS

Volkov, "Using piezoelectric oscillating system for welding synthetic fabrics", Welding International, Taylor & Francis, Abingdon, GB, vol. 27, No. 7 /9, Jul. 1, 2013, pp. 720-724, XP001585418.
Office Action (Notice of Reasons for Refusal) issued on Jul. 31, 2025, in corresponding Japanese Patent Application No. 2023-560866 and English translation of the Office Action. (14 pages).

\* cited by examiner

SEALING DEVICE FOR A PACKAGING MACHINE, PACKAGING MACHINE HAVING A SEALING DEVICE AND METHOD OF OPERATING A SEALING DEVICE

TECHNICAL FIELD

The present invention relates to a sealing device for the sealing, in particular the transversal sealing, of packages, in particular composite packages, within a packaging machine for the packaging of pourable products, in particular pourable food products.

Advantageously, the present invention also relates to a packaging machine for the packaging of pourable products, in particular pourable food products, into packages, in particular composite packages, and having at least one sealing device for the sealing of packages.

Furthermore, the present invention also relates to a method of operating a sealing device within a packaging machine for the packaging of pourable products, in particular pourable food products, into packages, in particular composite packages.

BACKGROUND ART

As is known, many liquid or pourable food products, such as fruit juice, UHT (ultra-high-temperature treated) milk, wine, tomato sauce, etc., are sold in packages, in particular sealed packages, made of sterilized packaging material.

A typical example is the parallelepiped-shaped package for pourable food products known as Tetra Brik Aseptic (registered trademark), which is made by sealing and folding a laminated strip packaging material. The packaging material has a multilayer structure comprising a carton and/or paper base layer, covered on both sides with layers of heat-seal plastic material, e.g. polyethylene. In the case of aseptic packages for long-storage products, the packaging material also comprises a layer of oxygen-barrier material, e.g. an aluminum foil, which is superimposed on a layer of heat-seal plastic material, and is in turn covered with another layer of heat-seal plastic material forming the inner face of the package eventually contacting the food product.

Packages of this sort are normally produced on fully automatic packaging machines, which, in use, advance a web of packaging material through a sterilization unit of the packaging machine for sterilizing the web of packaging material. Then, the sterilized web of packaging material is maintained and advanced within an isolation chamber, and is folded and sealed longitudinally to form a tube, which is further advanced. Furthermore, the tube is filled with a pourable product, and is transversally sealed and cut along equally spaced transversal cross sections within a package forming apparatus of the packaging machine during the tube's advancement.

In more detail, the package forming apparatus comprises a plurality of forming and sealing assemblies, each one, in use, shaping and transversally sealing and cutting the tube so as to obtain the single packages.

Each forming and sealing assembly comprises a respective sealing device for transversally sealing the tube for obtaining a respective transversal seal portion by locally compressing the tube and heating the respective portions of the layers of heat-seal plastic material. The heating may e.g. occur by sealing devices generating ultrasonic vibrations.

The sealing devices which heat by means of ultrasound vibrations comprise a sonotrode configured to generate the ultrasonic vibrations and an anvil, which is designed to cooperate with the sonotrode so as to locally compress the tube.

A typical sonotrode comprises a sonotrode head having a sealing surface extending along a longitudinal axis and a vibration control unit connected to the sonotrode head and configured to actuate ultrasonic vibrations of the sonotrode head.

In more detail, the vibration control unit comprises a housing shell and one or more piezoelectric transducers arranged within the housing shell and configured to generate ultrasonic vibrations to be coupled into the sonotrode head.

It is known that piezoelectric transducers have a limited lifetime as being subjected to an aging and, thus, the sonotrode as a whole or at least the piezoelectric transducers must be exchanged according to pre-established maintenance protocols.

Even though the known sealing devices operate with a high quality and reliability a desire is felt in the sector to further improve the known sealing devices.

In particular, a desire is felt to operate with the respective sonotrodes as long as possible and to avoid any unwanted failures.

DISCLOSURE OF INVENTION

It is therefore an object of the present invention to provide in a straightforward and low-cost manner an improved sealing device.

It is a further object of the present invention to provide in a straightforward and low-cost manner a packaging machine having an improved sealing device.

Additionally, it is an object of the present invention to provide in a straightforward and low-cost manner an improved method of operating a sealing device.

According to the present invention, there is provided a sealing device according to the independent claim 1.

Preferred embodiments of the sealing device are claimed in the claims being directly or indirectly dependent on claim 1.

According to the present invention, there is also provided a packaging machine according to claim 11.

Additionally, according to the present invention, there is also provided a method according to claim 12.

Preferred embodiments of the method are claimed in the claims being directly or indirectly dependent on claim 12.

BRIEF DESCRIPTION OF THE DRAWINGS

A non-limiting embodiment of the present invention will be described by way of example with reference to the accompanying drawings, in which.

BEST MODES FOR CARRYING OUT THE INVENTION

Figure 1:
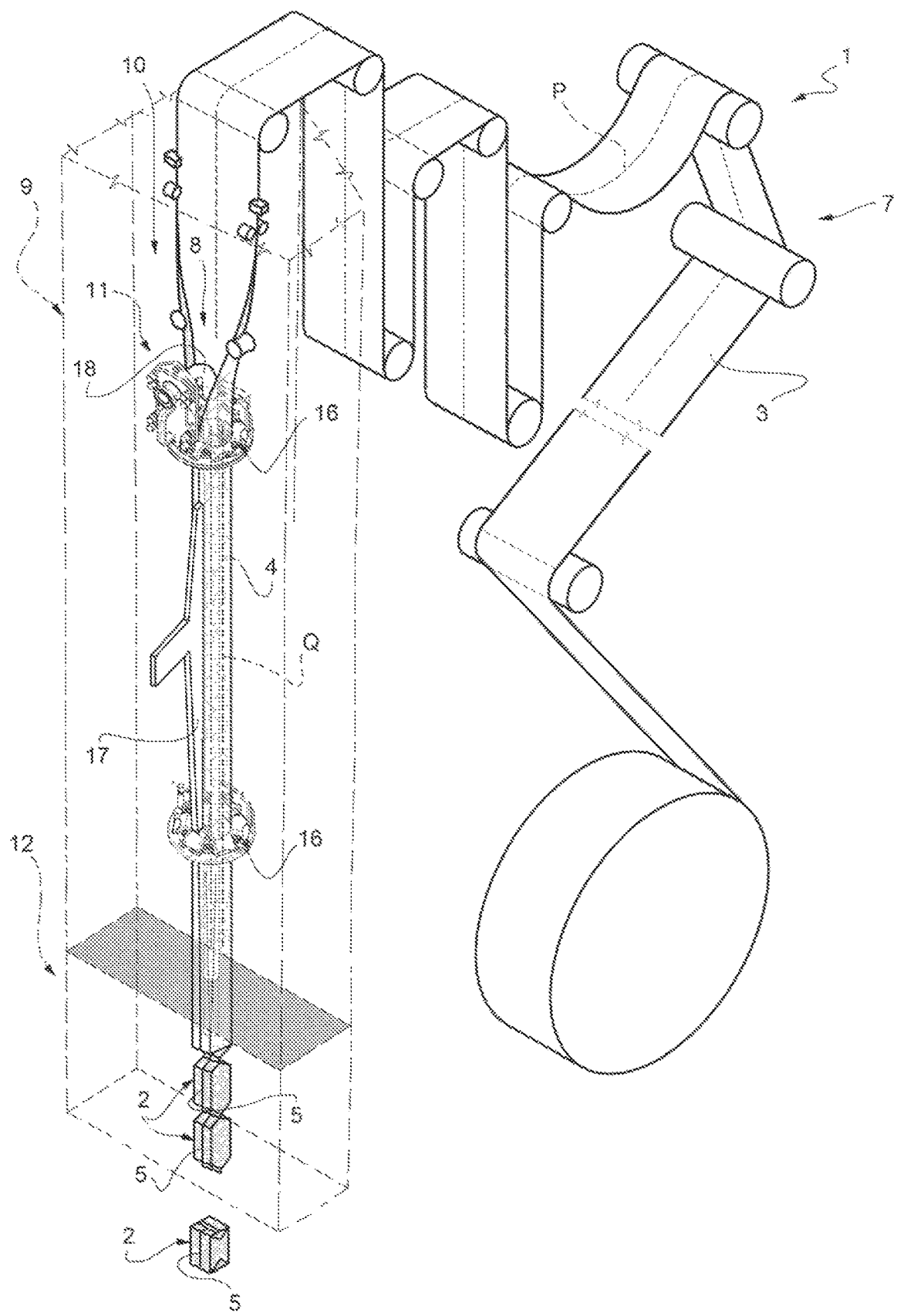
FIG. 1 is a schematic view of a packaging machine having at least one sealing device according to the present invention, with parts removed for clarity.

Number 1 indicates as a whole a packaging machine for producing sealed packages 2 of a pourable product, in particular a pourable food product, such as (pasteurized) milk, fruit juice, wine, tomato sauce, salt, sugar etc.

In more detail, packaging machine 1 may be configured to produce composite packages 2 from a composite multilayer packaging material.

In further detail, the packaging material may comprise at least one layer of fibrous material, such as e.g. a paper or cardboard, and at least two layers of heat-seal plastic material, e.g. polyethylene, interposing the layer of fibrous material in between one another. One of these two layers of heat-seal plastic material defining the inner face of main body 2 contacting the pourable product.

Moreover, the packaging material may also comprise a layer of gas- and light-barrier material, e.g. aluminum foil or ethylene vinyl alcohol (EVOH) film, in particular being arranged between one of the layers of the heat-seal plastic material and the layer of fibrous material. Preferentially, the packaging material may also comprise a further layer of heat-seal plastic material being interposed between the layer of gas- and light-barrier material and the layer of fibrous material.

In further detail, the packaging material may be provided in the form of a web 3.

Furthermore, packaging machine 1 may be configured to produce packages 2 by forming a tube 4 from web 3, longitudinally sealing tube 4, filling tube 4 with the pourable product and to transversally seal and cut tube 4.

A typical package 2 obtained by packaging machine 1 comprises a longitudinal seam portion 5 and a pair of a respective first transversal sealing band and a respective second transversal sealing band, in particular arranged at opposite sides of package 2. In particular, the first transversal sealing band may define a transversal top sealing band and the second transversal sealing band may define a transversal bottom sealing band.

With particular reference to FIG. 1, packaging machine 1 may comprise:
- a conveying device 7 for advancing (in a known manner) web 3 along a web advancement path P to a forming station 8, at which, in use, web 3 is formed into tube 4;
- an isolation chamber 9 having an inner environment, in particular an inner sterile environment containing a sterile gas, and being separated from an (hostile) outer environment;
- a tube forming and sealing device 10 configured to form tube 4 from the, in use, advancing web 3 within the inner environment and to longitudinally seal tube 4 within the inner environment;
- a filling device 11 for continuously filling tube 4 with the pourable product; and
- a package forming apparatus 12 configured to form, to transversally seal and to transversally cut the, in use, advancing tube 4 for forming packages 2.

Moreover, packaging machine 1 may also comprise a sterilizing unit configured to sterilize the, in use, advancing web 3 at a sterilization station, in particular the sterilization station being arranged upstream of forming station 8 along web advancement path P.

In more detail, conveying device 7 may be configured to advance tube 4 and any intermediates of tube 4 along a tube advancement path Q, in particular from forming station 9 to package forming unit 16. In particular, under intermediates of tube 4 any configuration of web 3 is meant prior to obtaining the tube structure and after folding of web 3 by tube forming and sealing device 10 has started. In other words, the intermediates of tube 4 are a result of the gradual folding of web 3 so as to obtain tube 4, in particular by overlapping the edges of web 3 with one another.

Preferentially, tube forming and sealing device 10 may be arranged such that tube 4 may present a vertical orientation.

In more detail, tube forming and sealing device 10 may comprise at least two forming ring assemblies 16, in particular arranged within isolation chamber 9, being configured to gradually fold in cooperation with one another web 3 into tube 4, in particular by overlapping the edges of web 3 with one another. Thereby, in use, seam portion 5 of tube 3 is formed.

Additionally, tube forming and sealing device 10 may comprise a sealing head 17, in particular arranged within isolation chamber 9 and, configured to longitudinally seal tube 4, in particular along seam portion 5.

Moreover, tube forming and sealing device 10 may also comprise a pressuring assembly configured to exert a mechanical force on seam portion 5 so as to ensure sealing of tube 4 along seam portion 5.

Additionally, filling device 11 may comprise a filling pipe 18 being configured to direct, in use, the pourable product into tube 4. In particular, filling pipe 18 may, in use, be at least partially placed within tube 4 for feeding, in use, the pourable product into tube 4.

Figure 2:
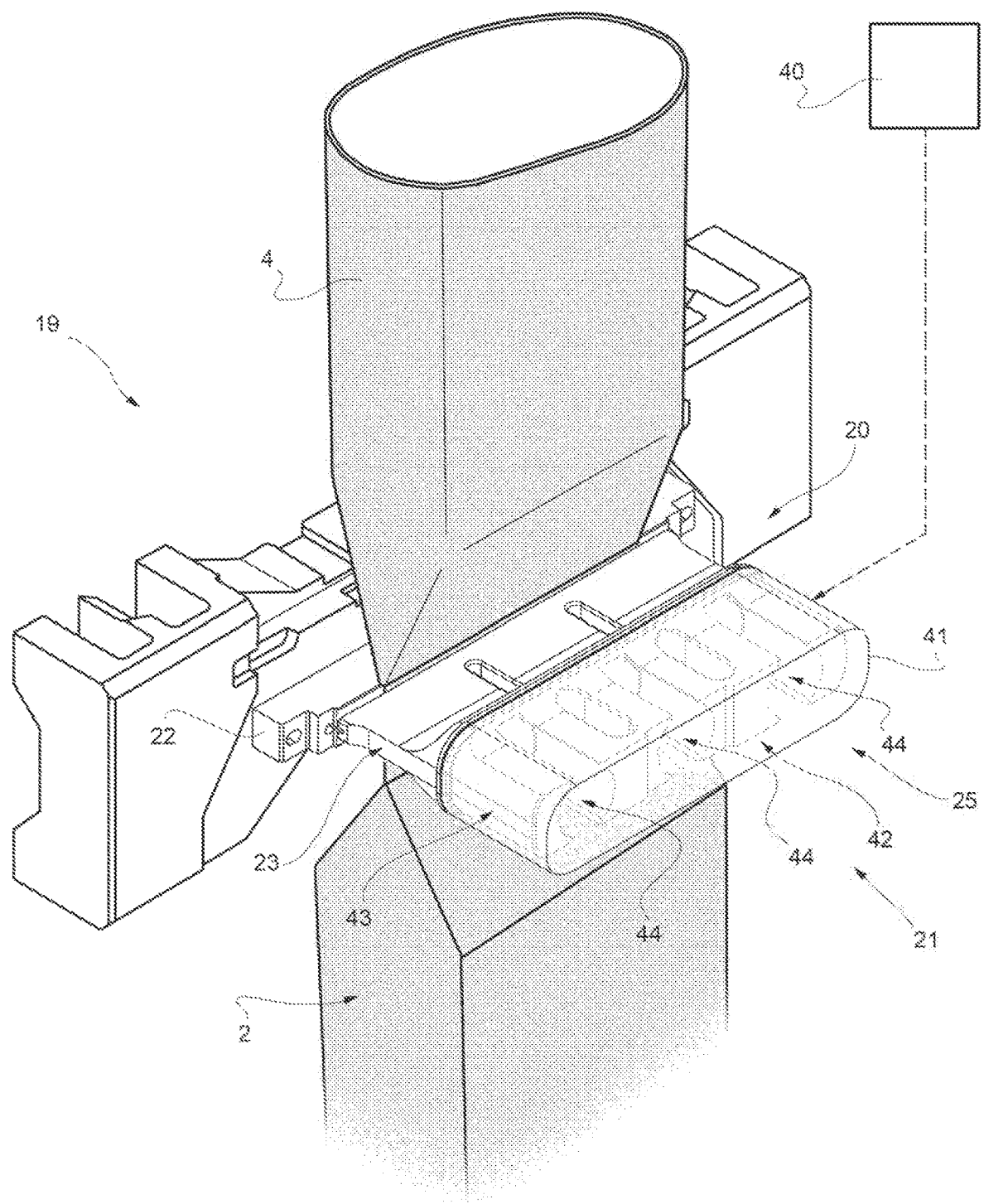
FIG. 2 is a schematic view of a detail of the packaging machine of FIG. 1 comprising portions of the sealing device according to the present invention, with parts removed for clarity.

With particular reference to FIGS. 1 and 2, package forming apparatus 12 may comprise:
- a plurality of forming and sealing assemblies 19 (only partially shown to the extent necessary for the comprehension of the present invention in FIG. 2), each one configured to at least form (shape) tube 4, to transversally seal tube 4, and in particular to also transversally cut tube 4; and
- a conveying unit (not shown and known as such) so as to advance forming and sealing assemblies 19.

In particular, package forming apparatus 12 is configured to control forming and sealing assemblies 19 and the conveying unit such to transversally seal and cut tube 4 along equally spaced transversal cross sections.

In more detail, each forming and sealing assembly 19 may comprise:
- a forming shell (not shown and known as such) configured to at least partially define the shape of packages 2; and
- a sealing device 20 configured to at least transversally compress, in particular flat-lay and squeeze, and to transversally seal tube 4, in particular during advancement of tube along path Q and between two respective packages 2.

Moreover, each forming and sealing assembly 19 may comprise a cutting device (not shown) for transversally cutting tube 4.

In particular, each sealing device 20 is configured to form a main sealing band and the respective cutting device is configured to transversally cut through the main sealing band. Even more particular, each main sealing band combines the respective first transversal sealing band of a leading package 2 and the respective second transversal sealing band of the successive package 2.

In further detail, each forming shell may comprise at least a first half-shell (not shown and known as such) and a second half-shell (not shown and known as such) configured to at least partially define in cooperation the shape of packages 2. In particular, the first half-shell and the second half-shell are configured to contact tube 4 from opposite sides thereof.

In more detail, each sealing device 20 is of the ultrasonic type; i.e. sealing device 20 is configured to generate ultrasonic vibrations suited to heat portions of the layers of heat-seal plastic material.

Moreover, each sealing device 20 may comprise at least:
- a sonotrode 21 for generating ultrasonic vibrations, in particular for heating/melting the respective portions of the layers of heat-seal plastic material; and
- an anvil 22 for compressing, in particular for locally flat-lying and squeezing, in cooperation with sonotrode 21 tube 4.

In further detail, each cutting device comprises at least one moveable blade so as to transversally cut tube 4.

Furthermore, each sonotrode 21 is associated to one respective first half-shell, in particular defining a first operative portion of the respective forming and sealing assembly 19, and each anvil 22 is associated to one respective second half-shell, in particular defining a second operative portion of the respective forming and sealing assembly 19.

Additionally, the respective blade of the respective cutting device is associated to the respective sonotrode 21 or to the respective anvil 22, in the specific case the respective anvil 22. In other words, each cutting device is either associated to the respective first operative portion or the respective second operative portion, in the specific case shown to the respective second operative portion.

Furthermore, the conveying unit may be configured to advance the respective first operative portions along a first path and the respective second operative portions along a second path.

Moreover, each first operative portion and the respective second operative portion may be configured to cooperate with one another for forming a package 2 when advancing along a respective operative section of the first path and the second path, respectively.

Figure 3:
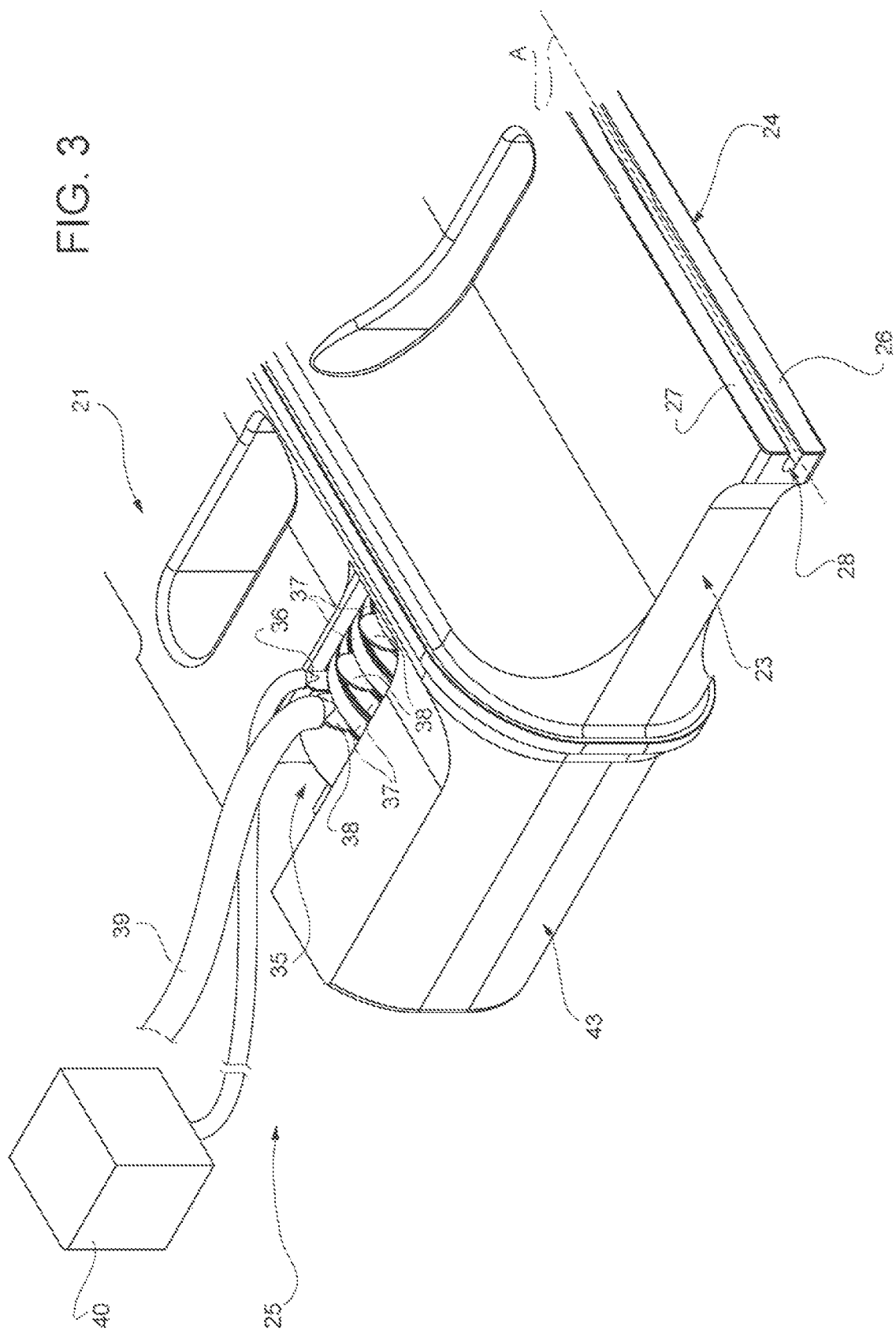
FIG. 3 is a side view of a portion of the sealing device of FIG. 2, with parts removed for clarity.
Figure 4:
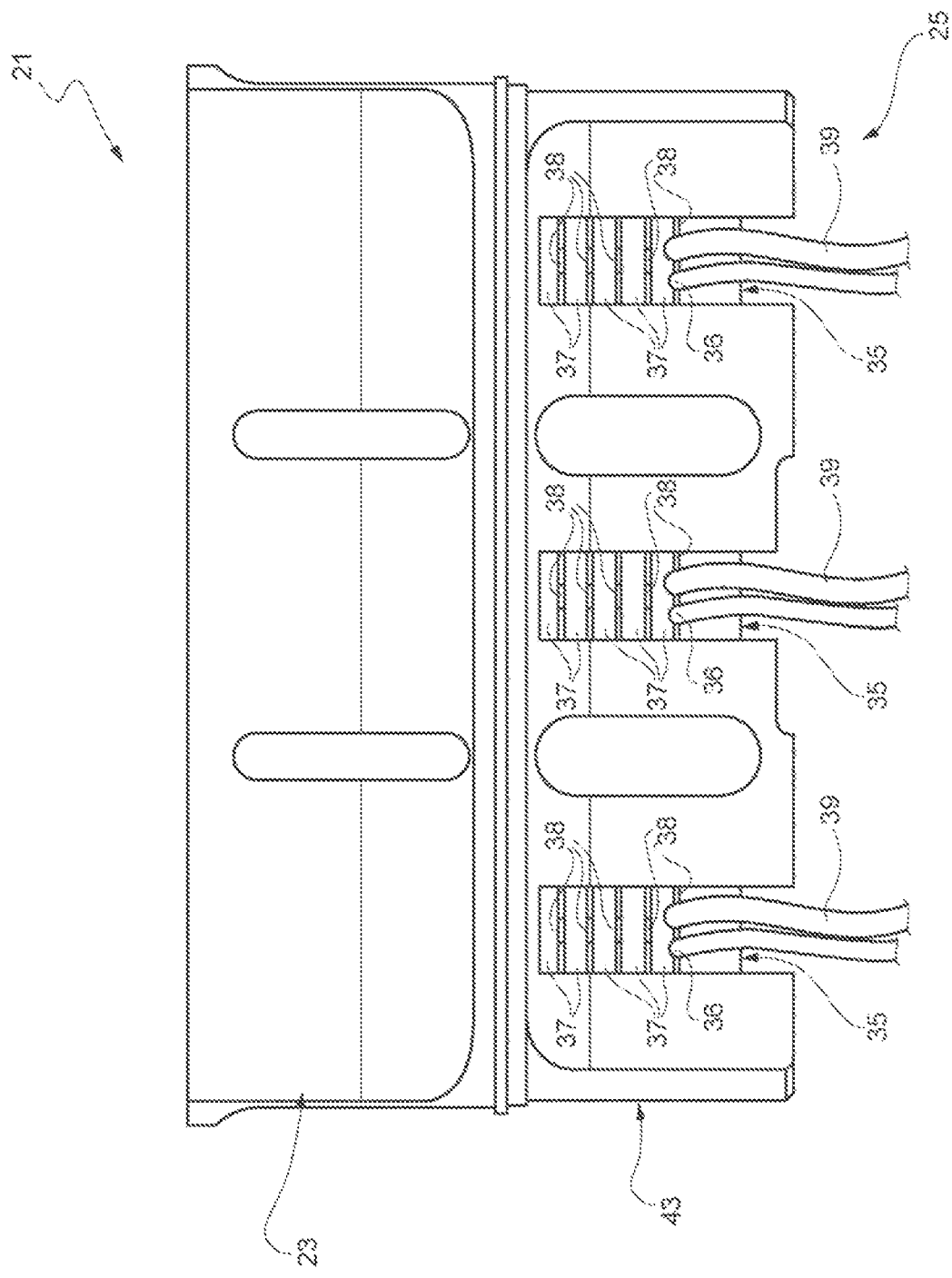
FIG. 4 is an enlarged perspective view of the portion of FIG. 3, with parts removed for clarity.

With particular reference to FIGS. 3 and 4, each sonotrode 21 comprises at least:
- a sonotrode head 23, in particular having a sealing surface 24 extending along a longitudinal axis A; and
- a vibration control unit 25 connected to sonotrode head 23 and configured to actuate ultrasonic vibrations of sonotrode head 23.

In more detail, each sealing surface 24 may be designed to contact tube 4 and to establish an operative connection with the portions of the layers of heat-seal plastic material.

Furthermore, each sealing surface 24 may comprise a first portion 26 and a second portion 27 displaced from and being parallel to one another.

Moreover, each sonotrode head 23 may comprise a groove 28, in particular interposed between the respective first portion 26 and the respective second portion 27. In particular, each groove 28 is designed to receive a portion of the respective blade during the transversal cutting of tube 4.

With particular reference to FIGS. 2 to 4, each vibration control unit 25 may comprise one or more piezoelectric transducer devices 35 (shown in FIGS. 3 and 4) configured to generate the ultrasonic vibrations to be coupled into the respective sonotrode head 23. In the specific case shown, vibration control unit 25 comprises three piezoelectric transducer devices 35, however, the number may vary in dependence of the format of packages 2; i.e. in dependence of the format of packages 2, the extension of sealing surface 24 may be larger or shorter; in particular a shorter sealing surface 24 may require less piezoelectric transducer devices 35 than a larger one.

Additionally, each vibration control unit 25 may comprise one or more temperature sensors 36 configured to (directly or indirectly) measure the temperature of piezoelectric transducer (s) 35 for determining and/or controlling respective operating states of piezoelectric transducer (s) 35.

In particular, the Applicant has observed that the temperature of each piezoelectric transducer device 35 is indicative about operating characteristics of the piezoelectric transducer device 35 and/or about the aging of the piezoelectric transducer device 35 and/or about the remaining lifetime of the piezoelectric transducer device 35. E.g. the Applicant has found that each piezoelectric transducer device 35 degrades with time as a result of its operation leading to an increase of heat dissipation during use.

Preferentially, temperature sensor (s) 36 is/are configured to continuously and/or in real time measure the temperature of piezoelectric transducer (s) 35. In particular, so as to continuously and/or in real time determine and/or monitor the operational states of piezoelectric transducer (s) 35.

According to the specific example shown, at least one temperature sensor 36 is associated to each piezoelectric transducer device 35 so as to measure the respective temperature and so as to allow for the determination and/or monitoring of the operational state(s) of the respective piezoelectric transducer device 35.

According to some possible embodiments, each temperature sensor 36 is connected to the respective piezoelectric transducer device 35 so as to (directly) measure the respective temperature.

Alternatively, each temperature sensor 36 could determine the respective temperature in non-contact mode.

According to some possible alternative embodiments, it may also be possible, to determine the temperature of piezoelectric transducer (s) 35 by means of an average temperature of the respective piezoelectric transducer devices 35 of the respective sealing device 20.

In further detail, each temperature sensor 35 may be a thermistor; i.e. the temperature determined by temperature sensor 35 results from a variation of the resistance of temperature sensor 36.

In even further detail, each temperature sensor 35 may be a negative temperature coefficient (NTC) thermistor (i.e. the resistance decreases with increasing temperature) or a positive temperature coefficient (PTC) thermistor (i.e. the resistance increases with increasing temperature).

It should be noted that such types of temperature sensors 35 have a preciseness lying by about +/−0.5° C. Thus, such a preciseness is limited with respect to other types of temperature sensors. The Applicant has, however, found that the preciseness offered by thermistors, in particular NTC thermistors and PTC thermistors, is sufficient so as to determine and/or monitor the operational states of piezoelectric transducer devices 35. Thus, by relying on thermistors, in particular NTC thermistors and PTC thermistors, it is possible to obtain a more economical solution with respect to other types of temperature sensors, which are more costly, but still reliably determining the operational states of piezoelectric transducer devices 35.

With particular reference to FIG. 4, each piezoelectric transducer device 35 may comprise a plurality of piezoelectric (ceramic) elements 37 stacked one on top of one another. In more detail, each piezoelectric transducer device 35 may also comprise a plurality of conductive metal sheets, in particular forming together with piezoelectric elements 37 a stack of alternate piezoelectric elements 37 and conductive metal sheets. Preferentially, the respective temperature sensor 36 may be configured to measure the temperature of the respective piezoelectric elements 37.

Additionally, each sealing device 20, in particular the respective vibration control unit 25, may comprise one or more generators (not shown and known as such) operatively connected to piezoelectric transducer (s) 35, in particular piezoelectric elements 37, so as to actuate and control the ultrasonic vibrations of piezoelectric transducer (s) 35.

Furthermore, each piezoelectric transducer device 35 may comprise at least one metal connector 38, in particular connected to one respective conductive metal sheet, designed to establish an electrical connection with at least one generator. In particular, each vibration control unit 25 comprises one or more electrical cables 39, each one connected to at least one generator and to at least one metal connector 38 so as to establish the electrical connection between the generator and metal connector 38.

Advantageously, each temperature sensor 36 is in contact with the respective metal connector 38 of the respective piezoelectric transducer device 35 (so as to establish contact with the respective piezoelectric transducer device 35).

Preferentially, each metal connector 38 may comprise, in particular consist of, copper. As copper has very good thermal properties, this guarantees to ensure that the temperature determined by the respective temperature sensor 36 corresponds to the one of the respective piezoelectric transducer device 35, in particular the respective piezoelectric elements 37.

According to some possible non-limiting embodiments, packaging machine 1, in particular package forming apparatus 12, may comprise at least one analysis unit 40 operatively coupled to temperature sensors 36 and configured to monitor and/or determine the operating state of piezoelectric transducer devices 35 in dependence of the temperature determined by temperature sensors 36.

According to some possible non-limiting embodiments, each sealing device 20 comprises a respective portion of analysis unit 40 being operatively connected to the respective temperature sensor (s) 36 so as to measure the temperature of the respective piezoelectric transducer devices 35, in particular the respective portion of analysis unit 40 being configured to monitor and/or determine the operating state of piezoelectric transducer devices 35 in dependence of the temperature determined by temperature sensors 36.

Furthermore, analysis unit 40 and/or the portions of analysis unit 40 may be configured to plan maintenance activities based on the operating state (s) of piezoelectric transducer devices 35. In particular, analysis unit 40 and/or the portions of analysis unit 40 may be configured to plan the maintenance activities as a function of the remaining lifetime and/or the aging of piezoelectric transducer devices 35. In this way, it is possible to optimize the use of piezoelectric transducer devices 35.

E.g. each analysis unit 40 and/or the portions of analysis unit 40 may signal the remaining lifetime of a piezoelectric transducer device 35 and signal that the maintenance should be executed within a certain time regime.

Furthermore, analysis unit 40 and/or the portions of analysis unit 40 may be configured to assess the possible occurrence of an anomalous working condition based on the temperature (s) measured by temperature sensor (s) 36. Additionally, analysis unit 40 and/or the portions of analysis unit 40 may be configured to alert about the risk of an anomalous working condition, e.g. by means of a prompt on a human-machine interface (of packaging machine 1) and/or an acoustic message and/or an electronic message of similar.

Additionally, each vibration control unit 25 may further comprise at least a housing shell 41 (shown in FIG. 2; the transparent representation is for illustrative reasons) having an inner space 42. In particular, housing shell 41 is in contact with the respective sonotrode head 23 so as to seal inner space 42 from an outer space.

Preferentially, each piezoelectric transducer device 35 and each temperature sensor 36 are arranged within the respective inner space 42. In particular, also the respective generator (s) may be arranged within the respective inner space 42.

Moreover, each vibration control unit 25 may comprise a coupling portion 43 contacting the respective sonotrode head 23 along a respective contact surface. Additionally, each piezoelectric transducer device 35 may be placed within a respective seat 44 (see in particular FIG. 2) of the respective coupling portion 43 and in contact with coupling portion 43 so as to allow for the transmission of the generated ultrasonic vibrations into the respective sonotrode head 23.

In use, packaging machine 1 produces packages 2 filled with the pourable product.

In more detail, conveying device 7 advances web 3 along web advancement path P to forming station 8. Tube forming and sealing device 10 forms tube 4 from the advancing web 3 and longitudinal seals tube 4.

Additionally, filling device 11 fills tube 4 with the pourable product and package forming unit 12 forms, transversally seals and transversally cuts tube 4 so as to obtain packages 2.

In further detail, during operation of package forming unit 12, forming and sealing assemblies 19 form, transversally seal, and in particular also transversally cut tube 4 for obtaining respective filled packages 2.

Thereby, the forming occurs by means of the respective forming shell, in particular the cooperation of the respective first half-shell and the second half-shell with one another.

Additionally, the transversal sealing occurs by means of the respective sealing device 20.

Moreover, the transversal cutting occurs by means of the respective cutting device.

In more detail, operation of each sealing device 20 comprises at least the following main steps:
  compressing, in particular flat-lying and squeezing, tube 4 by cooperation of the respective anvil 22 and the respective sonotrode 21; and
  generating ultrasonic vibrations by means of sonotrode 21 for heating portions of the layers of heat-seal plastic material.

In even more detail, operation of each sealing device 20 further comprises the steps of:
  a) exciting ultrasonic vibrations of the respective sonotrode head 23 by means of operation of vibration control unit 25 the respective piezoelectric transducer (s) 35;
  b) measuring the temperature of the respective piezoelectric transducer (s) 35; and
  c) determining, in particular by means of analysis unit 40 and/or the respective portions of analysis unit 40, an operating state of the respective piezoelectric transducer (s) 35 based on the temperature obtained in step b).

In more detail, during each step b), the temperature of each piezoelectric transducer device 35 may be measured by the respective temperature sensor 36 and during the step c)

the operating state of each piezoelectric transducer device 35 may be determined in dependence of the respective temperature determined during the respective step b).

Preferentially, step b) and step c) may be continuously executed.

Furthermore, operation of each sealing device 20 may further comprise a step of transferring, during which the measurement results of the temperature sensors 36 may be transferred to analysis unit 40 and/or the respective portions of analysis unit 40.

In further detail, during step c) the remaining life time and/or the aging of piezoelectric transducer (s) 35 may be estimated.

Additionally, operation of each sealing device 20 may further comprise d) a step of planning, during which a maintenance is planned based on the operating state of the one or more piezoelectric transducer (s) 35. In particular, in this way, the maintenance can be planned based on the effective remaining life-time and/or aging of piezoelectric transducer (s) 35.

Moreover, operation of each sealing device 20 may also comprise a step of alerting, during which the risk of an anomalous working condition may be signaled, e.g. by means of a prompt on a human-machine interface and/or an acoustic message and/or an electronic message of similar.

The advantages of sealing device 20 and/or of packaging machine 1 and/or the method according to the present invention will be clear from the foregoing description.

In particular, by providing for temperature sensor (s) 36 it is possible to measure the temperature of piezoelectric transducer devices 35 and to monitor and/or determine the operating state of piezoelectric transducer devices 35 in dependence of the measured temperature. In this way, it is possible to monitor on whether piezoelectric transducer devices 35 operate in a correct manner and/or to determine the remaining lifetime and/or the aging of piezoelectric transducers. This again allows to base the decision on whether or not to executed maintenance activities based on the actual aging of piezoelectric transducer devices 35 and not according to a predetermined schedule. This also ensures avoiding undesired failures and unnecessary maintenance activities.

A further advantage resides in the possibility to obtain real-time data about the operational states of piezoelectric transducer devices 35 allowing to act quickly, thereby, further mitigating the risk of operating anomalies putatively impeding a correct operation of sealing devices 20.

Another advantage is to connect temperature sensors 36 onto respective metal connectors 38, which are already used for connecting piezoelectric transducer devices 35, in particular piezoelectric elements 37, by means of the respective electric cables to the respective 39 generator (s). In this way, one optimizes the space requirements.

A further advantage resides in using thermistors as temperature sensors 36. This are relatively cheap and easy to be installed. As well, their accuracy is sufficient for the specific application.

Clearly, changes may be made to sealing devices 20 and/or packaging machine 1 and/or the method as described herein without, however, departing from the scope of protection as defined in the accompanying claims.

Figure 5:
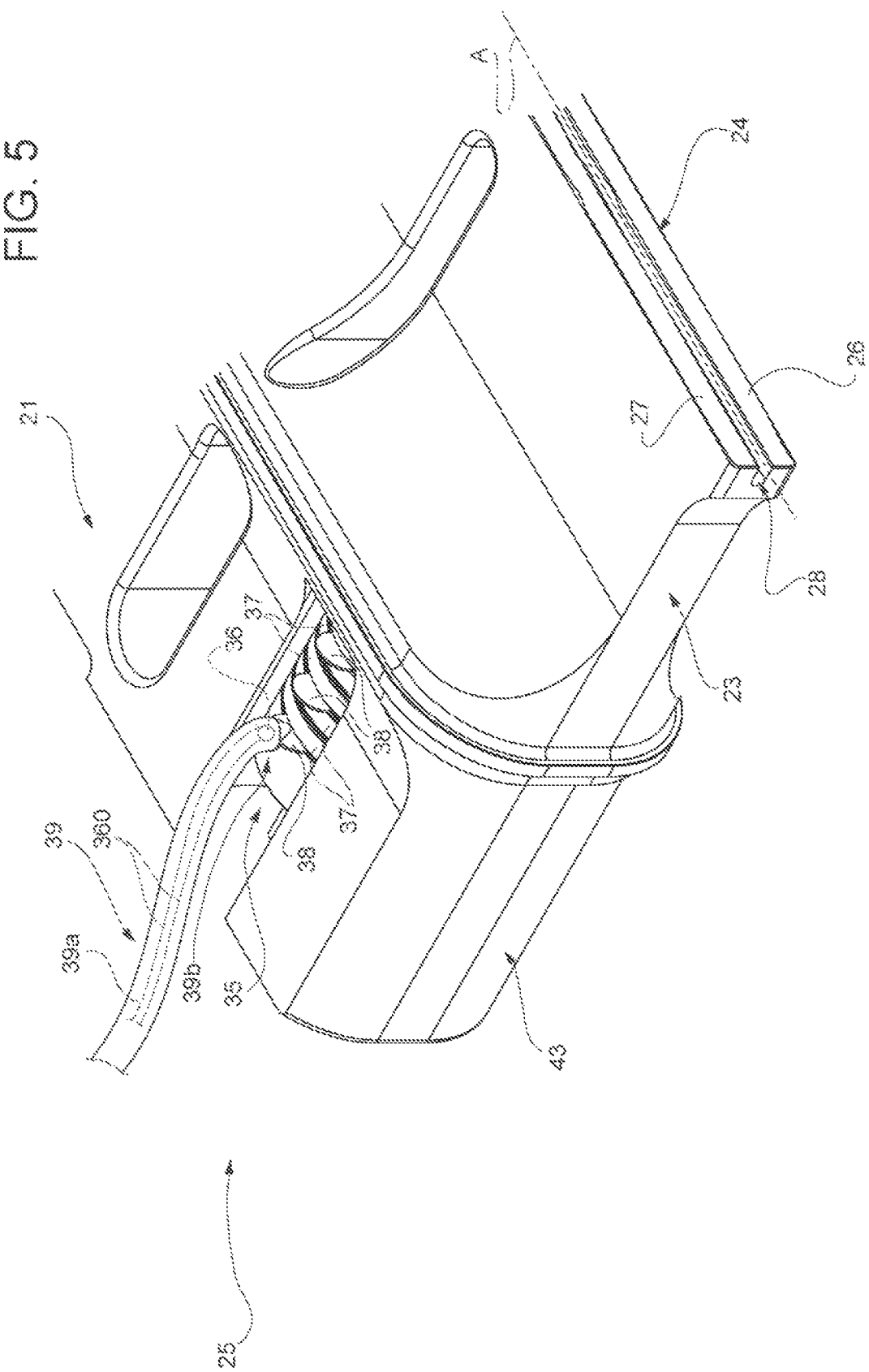
FIG. 5 is a side view of a portion of the sealing device of FIG. 2 according to one or more embodiments, with parts removed for clarity.

One or more embodiments may thus relate to a sealing device 20 for sealing packages 2 filled with a pourable product within a packaging machine 1, a portion of which is depicted in FIG. 5. It will be appreciated that the reference numbers used with reference to FIG. 5, where corresponding to reference numbers used previously with reference to the remaining figures, have the same meaning and refer to the same features.

The sealing device 20 has at least one sonotrode 21 comprising at least the sonotrode head 23 and the vibration control unit 25 connected to the sonotrode head 23 and configured to actuate ultrasonic vibrations of the sonotrode head 23.

As depicted in FIG. 5, the vibration control unit 25 may comprise:
  one or more piezoelectric transducer devices 35 configured to generate ultrasonic vibrations to be coupled into the sonotrode head 23;
  one or more electrical cables 39 configured to power (e.g. provide electrical connection and power to) respective one or more piezoelectric transducer devices 35, the one or more electrical cables 39 being connected to the respective one or more piezoelectric transducer devices 35 via a first extremity 39b; and
  one or more temperature sensors 36 configured to measure (e.g. directly or indirectly) the temperature of the one or more piezoelectric transducer devices 35 for determining and/or monitoring respective operating states of the one or more piezoelectric transducer devices 35, by measuring the temperature at the first extremity 39b of the one or more electrical cables 39.

In other words, the temperature sensor 36 may be configured to measure the temperature at the first extremity 39b of an electrical cable 39 that is indicative of the temperature of a respective piezoelectric transducer device 35. This way, it is possible to obtain a reliable, accurate and robust measure of the temperature of the piezoelectric transducer device 35 without the need of a direct contact therewith. In particular, the temperature at the first extremity of the electrical cable 39 closest to the piezoelectric transducer device 35 is extremely similar to that of the piezoelectric transducer device 35 and, as such, it is possible to obtain an accurate measure of the temperature of the piezoelectric transducer device 35. The embodiment depicted in FIG. 5 might be advantageous insofar as it can be particularly robust in view of the vibrations of the piezoelectric transducer devices 35.

The one or more temperature sensors 36 may be positioned at the first extremity 39b of the respective one or more electrical cables 39.

Each electrical cable 39 may comprise electrical wires and a protective sheath 39a surrounding the electrical wires. As depicted in FIG. 5, the one or more temperature sensors 36 may be positioned, e.g. at the first extremity 39b, between the protective sheath 39a and the electrical wires of the respective one or more electrical cables 39.

For example, the one or more temperature sensors 36 may be completely or partially covered by the protective sheath 39a of the respective one or more electrical cables 39. For example, the temperature sensor 36 may be pressed onto and/or kept in contact with the electrical wires by means of the sheath 39a. For example, the electrical cable (s) 360 providing power to the temperature sensors 36 may be similarly positioned between the protective sheath 39a and the electrical wires of the respective one or more electrical cables 39, e.g. being completely or partially covered by the protective sheath 39a.

In more detail, each electrical cable 39 may be connected to at least one generator and, at the first extremity 39b, to at least one metal connector 38 of the piezoelectric transducer devices 35 so as to establish the electrical connection between the generator and metal connector 38. The temperature sensor 36 may be configured to measure the temperature at the first extremity 39b, such temperature being indicative of the temperature at the piezoelectric transducer device 35 and at the metal connector 38. This way, in alternative to measuring the temperature of the metal connector 38, it is possible to measure the temperature at the first extremity of the electrical cable 39 and still obtain a reliable, robust and accurate measure of the temperature of the piezoelectric transducer device 35.

The temperature measure obtained by the temperature sensor 36 at the first extremity 39b of the electrical cable 39 may be thus indicative of the temperature of the respective one or more piezoelectric transducer device 35. The analysis unit 40 may be configured to:
- receive the one or more temperatures measured at the first extremity 39b of the one or more electrical cables 39, and
- calculate the temperature of the one or more piezoelectric transducer devices 35 as a function of the one or more temperature measured and preferably a corrective factor, e.g. a linear corrective factor.

For the avoidance of any doubt, each piezoelectric transducer device 35 has a respective electrical cable 39 that brings power thereto. Also, each temperature sensor 26 may be positioned at the extremity 39b of the respective electrical cable 39. That is, each temperature sensor 36 is associated (e.g. in contact or in close proximity) with a single electrical cable 39 and a single piezoelectric transducer device 35.

The invention claimed is:

1. Sealing device for sealing packages filled with a pourable product within a packaging machine;
    the sealing device having at least one sonotrode comprising at least:
        a sonotrode head; and
        a vibration control unit connected to the sonotrode head and configured to actuate ultrasonic vibrations of the sonotrode head;
    wherein the vibration control unit comprises:
        one or more piezoelectric transducer devices configured to generate ultrasonic vibrations to be coupled into the sonotrode head; and
        one or more temperature sensors configured to measure the temperature of the one or more piezoelectric transducer devices for determining and/or monitoring respective operating states of the one or more piezoelectric transducer devices;
    at least a housing shell having an inner space; and
    wherein each piezoelectric transducer device and each temperature sensor are arranged within the inner space.

2. Sealing device according to claim 1, wherein the one or more temperature sensors are operatively coupled and/or coupleable to an analysis unit configured to monitor and/or determine the operating state of the one or more piezoelectric transducer devices in dependence of the temperature measured by the one or more temperature sensors.

3. Sealing device according to claim 1, wherein at least one temperature sensor is associated to each piezoelectric transducer device so as to measure the temperature of the respective piezoelectric transducer device for determining and/or monitoring the operational state of the respective piezoelectric transducer device.

4. Sealing device according to claim 3, wherein each temperature sensor is in contact with the respective piezoelectric transducer device.

5. Sealing device according to claim 3, wherein each piezoelectric transducer device comprises a metal connector designed to establish an electrical connection with a generator of the sealing device;
    wherein each temperature sensor is in contact with the metal connector of the respective piezoelectric transducer device.

6. Sealing device according to claim 5, wherein the metal connector comprises copper.

7. Sealing device according to claim 1, wherein:
    the vibration control unit comprises one or more electrical cables configured to power the respective one or more piezoelectric transducer devices, the one or more electrical cables being connected to the respective one or more piezoelectric transducer devices via a first extremity of the electrical cables, and
    the one or more temperature sensors are configured to measure the temperature of the one or more piezoelectric transducer devices by measuring the temperature at the first extremity of the one or more electrical cables.

8. Sealing device according to claim 7, wherein the one or more temperature sensors are positioned at the first extremity of the respective one or more electric cables.

9. Sealing device according to claim 7, wherein each electrical cable comprises electrical wires and a protective sheath surrounding the electrical wires, and wherein the one or more temperature sensors are positioned between the protective sheath and the electrical wires of the respective one or more electrical cables.

10. Sealing device according to claim 1, wherein each temperature sensor is a thermistor.

11. Sealing device according to claim 10, wherein each temperature sensor is a negative temperature coefficient thermistor or a positive temperature coefficient thermistor.

12. Sealing device according to claim 1, wherein an operating state of the one or more piezoelectric transducer devices is the respective life time and/or the respective aging and/or operating characteristics of the one or more piezoelectric transducer devices.

13. Packaging machine for the packaging of pourable products into packages comprising at least one sealing device according to claim 1.

14. Method of operating a sealing device according to claim 1, the method comprising at least the steps of:
    a) exciting ultrasonic vibrations of the sonotrode head by operation of the one or more piezoelectric transducer devices;
    b) measuring the temperature of the one or more piezoelectric transducer devices; and
    c) determining an operating state of the one or more piezoelectric transducer devices based on the temperature obtained in step b).

15. Method according to claim 14, wherein during the step b), the temperature of each piezoelectric transducer device is measured by a respective temperature sensor and during the step c) the operating state of each piezoelectric transducer device is determined in dependence of the respective temperature determined during the step b).

16. Method according to claim 14, wherein during the step c) the remaining life time and/or the aging of the one or more piezoelectric transducer devices is estimated.

17. Method according to claim 14, further comprising d) a step of planning, during which a maintenance is planned based on the operating state of the one or more piezoelectric transducer devices.

18. Sealing device for sealing packages filled with a pourable product within a packaging machine;

the sealing device having at least one sonotrode comprising at least:
  a sonotrode head having a sealing surface extending in a longitudinal axis direction; and
  a vibration control unit connected to the sonotrode head and configured to actuate ultrasonic vibrations of the sonotrode head;
the vibration control unit comprising:
  first and second piezoelectric transducer devices each configured to generate ultrasonic vibrations to be coupled into the sonotrode head, the first and second piezoelectric transducer devices each comprising a stack of piezoelectric elements, the stack of piezoelectric elements of the first piezoelectric transducer device being spaced, in the longitudinal axis direction, from the stack of piezoelectric elements of the second piezoelectric transducer device; and
  a first temperature sensor operatively connected to the first piezoelectric transducer device to measure the temperature of the first piezoelectric transducer device, a second temperature sensor operatively connected to the second piezoelectric transducer device to measure the temperature of the second piezoelectric transducer device.

19. Sealing device according to claim 18, wherein the sonotrode head has a sealing surface configured to contact the tube of packaging material during the sealing of the tube of packaging material, the sealing surface extending in a longitudinal axis direction and including a first sealing surface portion and a second sealing surface portion, the sonotrode head also including a groove configured to receive a portion of blade that operates to cut the tube, the groove extending in the longitudinal axis direction and being positioned between the first sealing surface portion and the second sealing surface portion so that the first and second sealing surface portions are separated from one another by the groove.

20. Method of operating a sealing device in a packaging machine to seal packaging material, the sealing device including at least one sonotrode comprising a sonotrode head and a vibration control unit connected to the sonotrode head and configured to actuate ultrasonic vibrations of the sonotrode head, the vibration control unit comprising at least one piezoelectric transducer device configured to generate ultrasonic vibrations to be coupled into the sonotrode head and a temperature sensor configured to measure the temperature of the piezoelectric transducer device, the method comprising:
  a) exciting ultrasonic vibrations of the sonotrode head by operation of the piezoelectric transducer device to seal the packaging material;
  b) measuring the temperature of the piezoelectric transducer device; and
  c) using the temperature obtained in b) to determine aging of the piezoelectric transducer device and/or remaining lifetime of the piezoelectric transducer device.

* * * * *